(12) United States Patent
Saitoh et al.

(10) Patent No.: US 7,985,466 B2
(45) Date of Patent: Jul. 26, 2011

(54) LIGHT CONTROL FILM, LIGHTING DEVICE AND DISPLAY DEVICE

(75) Inventors: Goroh Saitoh, Tokyo (JP); Masao Imai, Tokyo (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 305 days.

(21) Appl. No.: 11/679,548

(22) Filed: Feb. 27, 2007

(65) Prior Publication Data
US 2007/0218261 A1 Sep. 20, 2007

(30) Foreign Application Priority Data

Mar. 17, 2006 (JP) ................................. 2006-075388

(51) Int. Cl.
*B32B 7/02* (2006.01)
(52) U.S. Cl. ....... 428/212; 428/411.1; 257/98; 313/112; 349/105
(58) Field of Classification Search .................. 428/212, 428/411.1; 257/98; 313/112; 349/105
See application file for complete search history.

(56) References Cited

U.S. PATENT DOCUMENTS

| | | | |
|---|---|---|---|
| 5,359,454 A * | 10/1994 | Steenblik et al. | 359/463 |
| 5,568,287 A | 10/1996 | Shingaki et al. | |
| 6,849,327 B1 * | 2/2005 | Ikuhara et al. | 428/339 |

FOREIGN PATENT DOCUMENTS

| | | |
|---|---|---|
| JP | 62-151501 U | 9/1987 |
| JP | 6-5462 B2 | 1/1994 |
| JP | 6-27974 B2 | 4/1994 |
| JP | 06-094902 A | 4/1994 |
| JP | 6-76934 U | 10/1994 |
| JP | 11-231794 A | 8/1999 |
| JP | 3043069 B2 | 3/2000 |
| JP | 2001-242797 A | 9/2001 |
| JP | 2003-066206 A | 3/2003 |
| JP | 2004-012918 A | 1/2004 |
| JP | 2004-020725 A | 1/2004 |
| JP | 2004-062084 A | 2/2004 |
| JP | 2004-109615 A | 4/2004 |
| JP | 2004-245918 A | 9/2004 |

OTHER PUBLICATIONS

Shuzo et al, JP 2004-020725 machine translation, Jan. 22, 2004.*

* cited by examiner

*Primary Examiner* — David R Sample
*Assistant Examiner* — Lawrence D Ferguson
(74) *Attorney, Agent, or Firm* — Sughrue Mion, PLLC

(57) ABSTRACT

A light control film including transparent layers and light absorbing layers arranged alternately is provided. The film is capable of controlling emission angle of light from the light source relatively strictly, and the light use efficiency thereof is improved. Further, a lighting device and a display device using thereof are provided. A transparent layer includes a high refractive index area and a low refractive index area, and further, a light reflective layer is provided at least on the light incident surface of the light absorbing layer out of the light absorbing layer and the low refractive index area. Thereby, a light control film having high light use efficiency is realized by utilizing reflection on the refractive index interface. At the same time, a lighting device capable of switching lighting angles and a display device capable of switching view angles, incorporating the control film, are realized.

20 Claims, 11 Drawing Sheets

FIG. 4B (WIDE EMISSION ANGLE LIGHTING)

SWITCH (NARROW EMISSION ANGLE LIGHTING)

(WIDE VIEW ANGLE DISPLAY)

SWITCH (NARROW VIEW ANGLE DISPLAY)

LIGHT CONTROL FILM, LIGHTING DEVICE AND DISPLAY DEVICE

BACKGROUND OF THE INVENTION

1. Field of the Invention

The present invention relates to a light control film which controls emission angle from a light source, and a lighting device and a display device using the same. In particular, the present invention relates to a light control film which emits light from the light source with high efficiency, and a lighting device and a display device using the same.

2. Description of Related Art

In recent years, an optical film (light control film) which is provided on a viewer side of a display or in between a liquid crystal display and a light source so as to control the emission angle is widely used in order to prevent a mobile telephone or a mobile PC from being peeped or to prevent reflection on the front glass of a car. As a kind of a light control film, Japanese Patent Application Laid-Open No. 2001-242797 (Patent Document 1) (pp. 2-5, FIG. 1) proposes a film in which portions of different refractive indexes are arranged alternately.

Patent Document 1 does not describe incident light on a film, emitted light from a film and light paths in a film, so details are unknown. However, in such a film as shown in Patent Document 1, if the light incident angle distribution on a film is large, light near the ultimate angle is made incident on the emitting surface, whereby light having wide emission angle is obtained. Further, light having larger angle than the ultimate angle returns to a light source direction, whereby the emission efficiency is easily lowered. Accordingly, if the incident distribution is large in particular, it is difficult for the film of Patent Document 1 to control emitted light and to realize high emission efficiency.

Further, Japanese Patent Publication No. 06-027974 (Patent Document 2) and Japanese Patent Publication No. 06-005462 (Patent Document 3) propose backlights in each of which a film having the same configuration as that of Patent Document 1 is disposed between a liquid crystal display and a light source. As described in Patent Document 2 (pp. 1-3, FIG. 3), such a backlight can cause light emitted from the light source at a certain angle to reflect on a film so as to be emitted in an emitting direction as a backlight. However, if the incident light angle distribution on a film is large, light transmitting the refractive index interface is caused, whereby it is difficult to control emitted light. Further, in general, in a cold cathode tube or an LED (light emission diode) used as a light source, pieces of light having various emission angles are emitted from one point of the light source, so the proportion of pieces of light having a certain angle as described in FIG. 3 of Patent Document 2 is small. Therefore, with the configuration shown in Patent Documents 2 and Patent Document 3 (pp. 1-3, FIG. 1) the controllable amount of light becomes small, so it is difficult to control light with high efficiency.

As a light control film, there is one having a structure in which transparent layers and shielding layers are arranged alternately, besides a structure in which layers of different refractive indexes are arranged alternately as described in Patent Documents 1 to 3.

For example, as described in Japanese Patent No. 3043069 (Patent Document 4) (p. 1, pp. 3-5, FIGS. 1 and 2), there is a film in which a center area includes a shielding layer having relatively high light absorption rate and outside areas contacting the transparent area and having relatively low light absorption rate, in order to prevent ghost image.

However, in a light control film using such shielding layers, the emitting direction and the emission angle of emitted light are controlled by controlling the thickness of the film and the width of a transparent layer sandwiched between shielding layers. This enables to control the emission angle strictly, but causes a problem of loss of light for the amount of the light absorbed in the shielding layers.

As a means to solve this problem, a film described in Japanese Patent Application Laid-Open No. 2004-062084 (Patent Document 5) (pp. 2-5, FIG. 1) has been proposed. The film described in Patent Document 5 is so configured that a layer having smaller refractive index than that of a louver layer (a layer in which transparent layers and shielding layers (light absorption layers) are arranged alternately) is provided on the light incident side to thereby suppress loss of light.

Further, Japanese Patent Application Laid-Open N 2004-020725 (Patent Document 6) (pp. 2-7, FIG. 2) proposes a film in which a light shielding layer is tilted and one surface of the light shielding layer consists of a light reflective-type shielding layer and the other surface consists of a light absorbing type shielding layer. In such a film, light reflected off the light reflective-type shielding layer returns to the light source side, and the light is reused so as to improve the light use efficiency and to prevent the luminance of the monitor from being lowered.

Further, Japanese Patent Application Laid-Open No. 2004-245918 (Patent Document 7) (pp. 2-8, FIG. 3) also proposes a film using absorbing layers and reflective layers. In Patent Document 7, by using a reflective layer contacting one surface of the transparent layer and an absorbing layer contacting the other surface, emission angle distribution from the film is made asymmetry so as to prevent reflection to thereby improve visibility in a state where the sheet is reclined.

Japanese Patent Application Laid-Open No. 2004-109615 (Patent Document 8) (pp. 2-7, FIGS. 1 and 2) describes a film in which all shielding layers consist of reflective layers. Further, Japanese Utility-Model Laid-Open No. 06-076934 (pp. 2-4, FIG. 1) proposes a liquid crystal display capable of preventing reflection and realizing transmission display and reflection display, by providing a reflective film, which transmits backlight and reflects outside light, on the backlight incident surface side of the light control film.

Further, Japanese Patent Application Laid-Open No. 06-094902 (Patent Document 10) (pp. 2-6, pp. 14-15, FIGS. 1 and 7) proposes an optical element having such a configuration that unit elements in each of which the surrounding of a refractive optical material is coated with a low refractive index material are arranged two-dimensionally via a light absorbing material. Further, Japanese Patent Application Laid-Open No. 2003-066206 (Patent Document 11) (pp. 2-4, FIG. 3) proposes a view enlarging member in which the emitting tilt surface of a trapezoidal lens is covered with a low refractive index layer and a part between tilt surfaces is filled with a light absorbing layer.

However, the structure in which layers of different refractive indexes are arranged alternately, described in Patent Documents 1 to 3, has the following problem. That is, if light incident distribution on a film is large, it is difficult to realize a sufficient control of emission angle and high emission efficiency, and the controllable amount of light is limited.

Further, the film described in Patent Document 4 involves a problem of causing a loss of light for the amount of light absorbed in the shielding layers. The film described in Patent Document 5, proposed to solve this problem, requires a low refractive index layer besides a louver layer, so the film is likely to be thick, and the effect thereof is 1.2 times that of a film without a low refractive index layer, which is small.

Further, in the film described in FIG. 2 of Patent Document 6, light reflected off a light reflective-type shielding layer may be absorbed in the light absorbing-type shielding layer, so light to be reused is reduced. Thereby, the effect of improving the light use efficiency becomes small. In the film described in Patent Document 7, the emission angle distribution from the film becomes asymmetry, so the film cannot be used for a device requiring symmetrical emission angle distribution like mobile equipment. Further, in asymmetrical emission angle distribution, light of the large emitted light distribution side (in Patent Document 7, a direction viewable in a state where the sheet is reclined) is not controlled, which causes light emitted to a waste angle.

Further, in the optical element described in FIG. 1 of Patent Document 10, light from the light source is also made incident on a light absorbing member, so the light use efficiency of the optical element largely drops. In order to solve this problem, Patent Document 10 proposes an element having a lens structure on the light source side of the optical element as shown in FIG. 7 of Patent Document 10. With this structure, the element becomes thick as a whole, so it is difficult to use it in mobile equipment which is required to be thinner.

Further, the element described in FIG. 3 of Patent Document 11 is intended to enlarge light from the light source (liquid crystal panel), different from Patent Documents 1 to 10, so the emission angle cannot be controlled (emitted light distribution from the light source cannot be narrowed). Further, the light absorbing layer in Patent Document 11 is a layer for absorbing stray light and improving the contrast, as described in paragraph [0011] of the specification thereof, so it has no relation with a control of emission angle.

SUMMARY OF THE INVENTION

It is an object of the present invention to provide a light control film capable of controlling emission angle easily with high light use efficiency, and by using it, provide a lighting device in which emission angle is controlled, and further, to provide a display device in which emission angle is controlled.

A light control film according to the present invention includes a film body having a plurality of transparent layers almost equally spaced by a plurality of light absorbing layers. Each transparent layer includes a high refractive index area occupying the center part thereof, and low refractive index areas contacting the light absorbing layers. Further, a reflective layer is provided on the light incident surface of the light absorbing layer.

With this structure, it is possible to control emission angle of light made incident on the transparent layer and emit the light with high efficiency, and to return the light made incident from the light source onto the position of light absorbing layer to the light source side with high efficiency so as to reuse it. Thereby, the light use efficiency can be further improved.

Note that the light reflecting layer may also be provided on the light incident surface of a low refractive index area of the transparent layer. Further, the film body may be so configured that a protective layer is provided on at least one of the light incident surface and the light emitting surface thereof, and the reflective layer is provided on the outer face of the protective layer.

Further, at least one of the light incident surface and the light emitting surface of the film body may be diffusion-processed (matt-processed).

With this structure, partial adhesion or close adhesion between another element arranged on the light incident surface or the light emitting surface of the light control film, an optical film (diffusion sheet, lens film, etc.), a light guide plate or the like and the light control film can be prevented so as to realize uniform emitted light.

Further, a lighting device according to the present invention is formed of the light control film described above and a light source (device). Thereby, a lighting device in which emission angle is controlled can be provided. The light source may be one in which a reflection plate/diffusion plate is combined with a cold cathode tube or one in which a light guide plate/reflection plate/optical film or the like is combined with an LED.

Further, a lighting device may be so configured that an element capable of controlling transmission/diffusion of incident light is arranged in an emitting surface direction of the light control film so as to be a lighting device capable of switching lighting having wide emission angle (transmission/diffusion controllable element is in a diffusing state) and lighting having narrow emission angle (transmission/diffusion controllable element is transparent). In such a case, in a lighting device capable of switching emission angles, by attaching the light control film and the transmission/diffusion controllable element, it is possible to eliminate surface reflection on the transmission/diffusion controllable element so as to improve the light use efficiency.

Further, by mounting a display panel on the lighting device of the present invention, a display device in which view angle is controlled can be provided. Further, by mounting a light control film according to the present invention on the outside display surface side (viewer's side) of a display device, it is possible to prevent limitation in view angle and reflection to thereby realize a display device having high light use efficiency. Such display devices include a CRT, a plasma display, an organic electroluminescence display and the like, besides a liquid crystal display device.

EFFECT OF THE INVENTION

According to the present invention, emission angle of light made incident on a transparent layer can be controlled and emitted with high efficiency, and light made incident from the light source onto the position of a light absorbing layer can be returned to the light source side with high efficiency so as to be reused. Thereby, it is possible to provide excellent light control film, lighting device and display device in which the light use efficiency can be further improved, which has not been achieved conventionally.

BRIEF DESCRIPTION OF THE DRAWINGS

FIGS. 1A and 1B are schematic illustrations showing a light control film according to an embodiment of the present invention, in which

FIGS. 2A and 2B are illustrations showing reflecting/transmitting effects with respect to incident light of the light control film shown in FIGS. 1A and 1B, in which

FIGS. 3A and 3B are illustrations showing functions of respective layers of the light control film shown in FIGS. 1A and 1B, in which

FIGS. 4A and 4B are illustrations showing examples of a lighting device according to the present invention, in which

FIGS. 5A and 5B are configuration diagrams showing a light source provided to the lighting device of FIG. 4, in which

FIGS. 7A and 7B show comparative experimental examples for comparing examples and conventional examples of the light control film according to the present invention; in which

FIGS. 9A and 9B show characteristic curves (emission angle distribution) of the light control film according to examples, in which

DESCRIPTION OF PREFERRED EMBODIMENTS

Hereinafter, an embodiment of the present invention will be described based on the accompanying drawings.

Figure 1A:
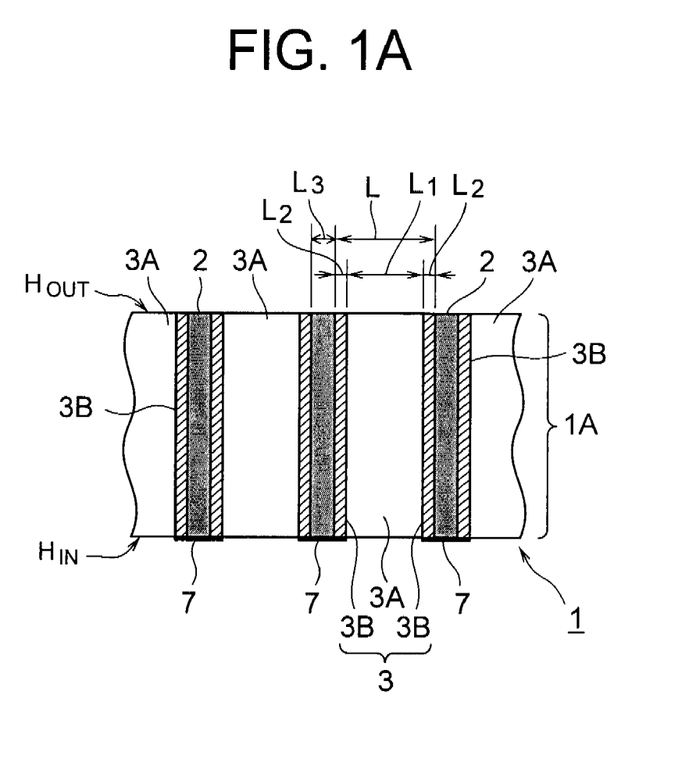
FIG. 1A is an illustration showing an example where no protective layer is provided on the light incident surface.

FIG. 1 shows a light control film 1 of the present embodiment. The light control film 1 includes a film body 1A having a plurality of transparent layers 3 almost equally spaced by a plurality of light absorbing layers 2. Each transparent layer 3 in the film body 1A includes a high refractive index area 3A occupying the center part thereof and low refractive index areas 3B arranged to contact the light absorbing layer 2. Further, the light incident surface $H_{IN}$ of the light absorbing layer 2 in the film body 1A is provided with a reflective layer 7. The reflective layer 7 may extend to the light incident surfaces $H_{IN}$ of the low refractive index areas 3B of the transparent layer 3 (FIG. 1A).

Figure 1B:
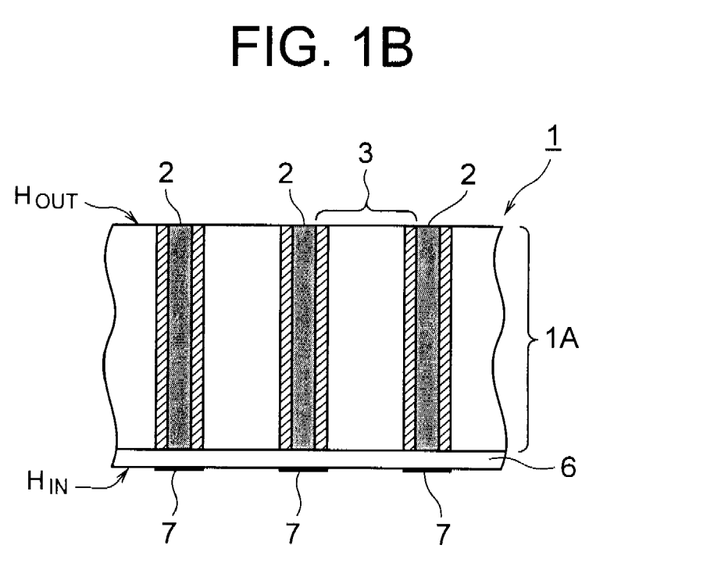
FIG. 1B is an illustration showing an example where a protective layer is provided on the light incident surface.

A protective layer 6 may be provided on at least one of the light incident surface $H_{IN}$ and the light emitting surface $H_{OUT}$ of the film body 1A (FIG. 1B). The embodiment of FIG. 1B shows the case where the protective layer 6 is provided on the light incident surface $H_{IN}$. In the present embodiment, the reflective layer 7 is provided on the outer face of the protective layer 6 (FIG. 1B).

Since the light control film 1 has such a structure, it is possible to control the emission angle of light made incident on the transparent layer 3 and emit it with high efficiency, and to return the light made incident from the light source onto the position of the light absorbing layer 2 to the light source side and to reuse it with high efficiency. Thereby, the light use efficiency can be improved.

The light incident surface $H_{IN}$ and the light emitting surface $H_{OUT}$ of the film body may be diffusion-processed (matt processed). The diffusion processing may be performed to either the light incident surface $H_{IN}$ or the light emitting surface $H_{OUT}$. With this configuration, partial adherence or close adherence between another element, an optical film (diffusion sheet, lens film, etc.), a light guide plate or the like, provided on the light incident side or on the light emitting side of the light control film 1, and the light control film 1 can be prevented so as to realize uniform emitted light.

Next, the light control film 1 will be described in detail.

Figure 2A:
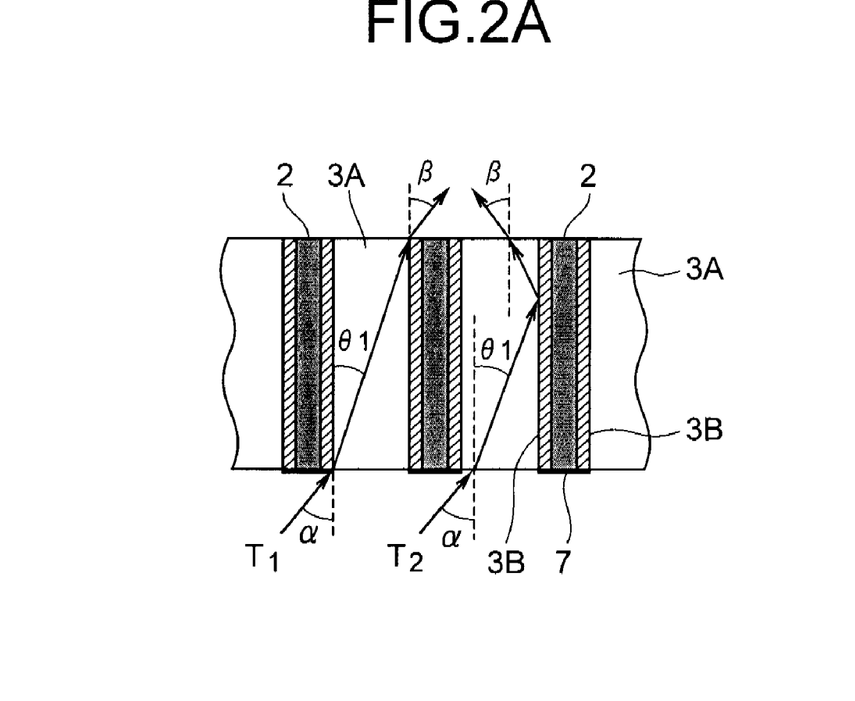
FIG. 2A is an illustration showing the state of transmission (emission)
Figure 2B:
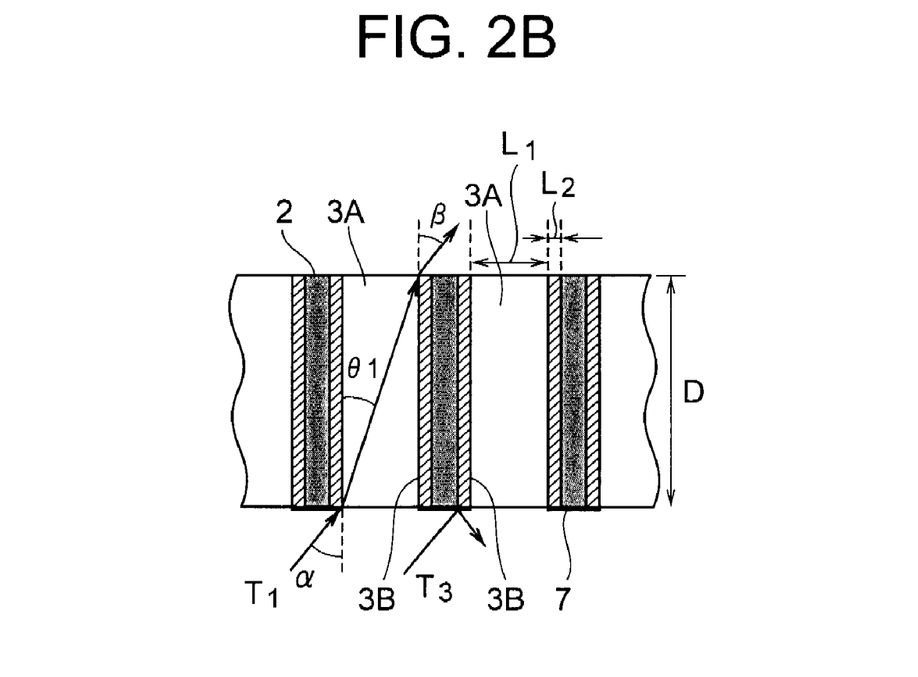
FIG. 2B is an illustration showing the state of transmission and reflection.

As shown in FIG. 2B, for the light control film 1, assuming that the thickness is D, the width of the high refractive index area 3A is $L_1$, the refractive index of the high refractive index area 3A is $n_1$, and the maximum value of the emission angle from the light control film 1 is $\beta$, the following equations are established:

$$\lambda_1 = \sin^{-1}[(1/n) \cdot \sin \beta] \tag{1}$$

$$\tan \theta_1 = (L_1/D) \tag{2}$$

Therefore, by determining $\beta$ and $L_1$ or determining $\beta$ and $D$, the structure of the light control film can be obtained.

Figure 3A:
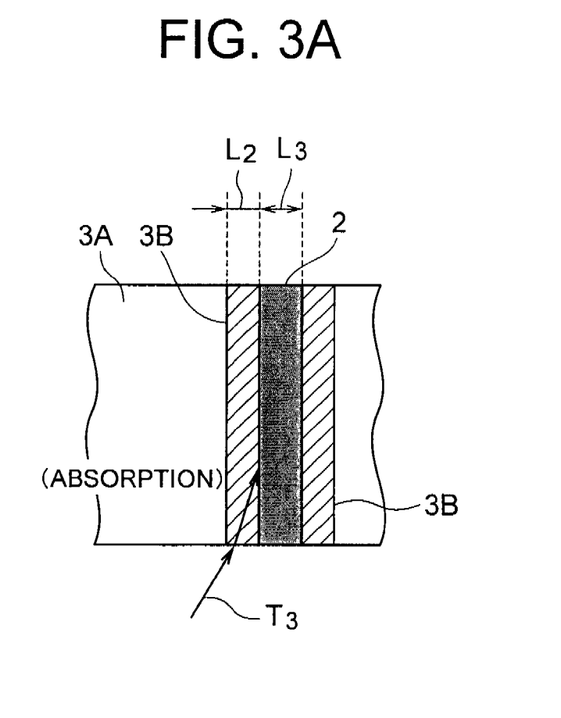
FIG. 3A is an illustration showing absorption of incident light (lost light) in the light absorbing layer.
Figure 3B:
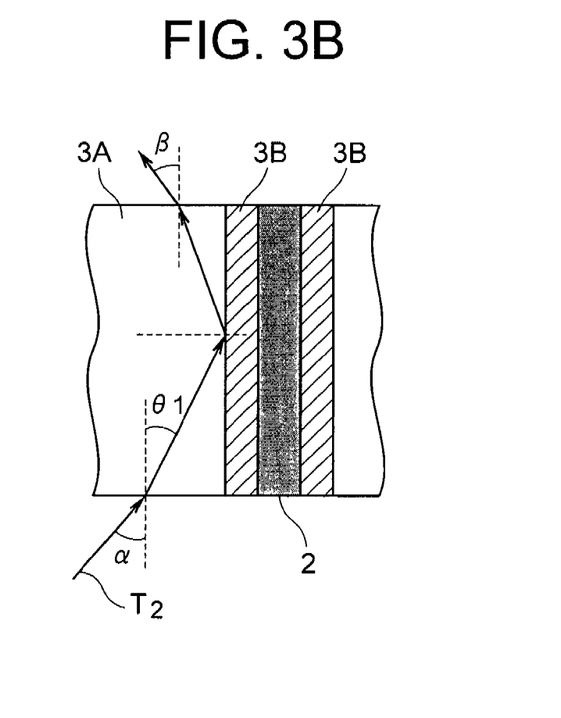
FIG. 3B is an illustration showing a state where light is reflected off the boundary between the high refractive index area and the low refractive index area so as to be emitted (transmission output)

In the case where the reflective layer 7 is not provided, the range of the width $L_2$ of the low refractive index area 3B is desirably as narrow as possible, and preferably, is less than a fourth of the width $L_1$ of the high refractive index area 3A, in order to suppress incidence of loss light as shown in the reference numeral $T_3$ in FIG. 3A. Further, if $L_2$ is much smaller than $L_1$, [width L of the transparent layer $3=L_1+2L_2$] may be used, instead of $L_1$ of the equation (2). Further, in order to secure the transparency of the light control film 1 as a whole, the relationship between the width L of the transparent layer 3 and the width $L_3$ of the light absorbing layer 2 is desirably $L \gg L_3$, in which L is preferably 0.11 to 0.5 mm, and $L_3$ is preferably 0.001 to 0.05 mm. FIG. 3B shows an emitting state, from the emitting surface, of the incident light $T_2$ made incident on the high refractive index area 3A.

Next, the relationship between the refractive index $n_1$ of the high refractive index area 3A and the refractive index $n_2$ of the low refractive index area 3B will be described by using FIG. 2. On the interface between the high refractive index area 3A and the low refractive index area 3B, from the critical angle of the light $T_2$ having an angle of $\theta_1$ in the light control film, the following equation is established:

$$n_2 = n_1 * \sin(90 - \theta_1) \tag{3}$$

Therefore, a condition that light having a larger angle than $\theta_1$ is not total-reflected and light having at least not a larger angle than $\theta_1$ is total-reflected is as follows:

$$n_1 > n_2 \geq n_1 * \sin(90 - \theta_1) \tag{4}$$

Accordingly, it is preferable that $n_1$ and $n_2$ satisfy the equation (4). Further, if $n_2$ is too close to $n_1$, light having an angle of near $\theta_1$ is not easily emitted in the light control film 1. Therefore, $n_2$ is desirably a smallest possible value which satisfies the equation (4).

In the present embodiment, the transparent layer 3 (high refractive index area 3A and low refractive index area 3B) of the light control film 1 may be made of a transparent high polymer material such as polyethylene, polypropylene and poly-silicon (silicon rubber). The light absorbing layer 2 may be made of a material in which the high polymer material mentioned above is mixed with a mixture of carbon black and pigment material. By laminating them sequentially, the light control film 1 of the present embodiment is obtained.

Note that the protective layer 6 (FIG. 1B) of the light control film 1 consists of a film made of polycarbonate, polyethylene terephthalate or the like. This film is bonded to the film body 1 with an adhesive to thereby serve as the protective layer 6. At this time, it is desirable that the refractive indexes of the protective layer and the adhesive coincide with the refractive index of the high refractive index area 3A of the film body 1. If their refractive indexes are different, it is only necessary to modify the equations (1) to (4) while taking into account the refractive index of the protective layer 6.

The reflective layer 7 may be provided on the film body A1 directly or on the protective layer 6 (FIG. 1). The reflective layer 7 can be formed by vapor deposition or sputtering.

Next, action of the light control film 1 in the present embodiment will be described.

Figure 11:
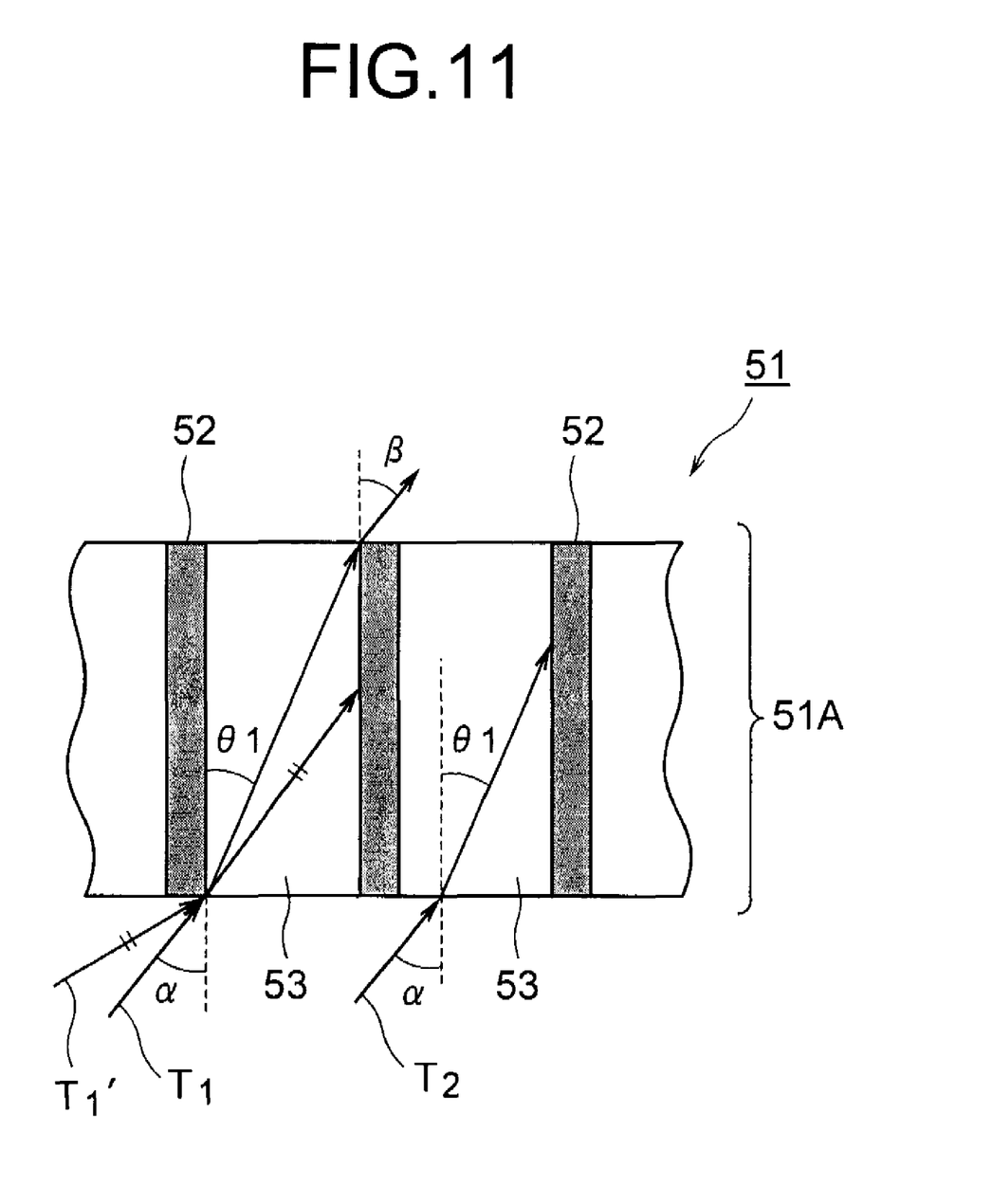
FIG. 11 is an illustration showing an effect of the light control film according to the conventional example.

As shown in FIG. 11, in a conventional light control film 51, the refractive angle $\theta_1$ inside the film body 51A is set such that light made incident on the boundary between the light absorbing layer 52 and the transparent layer 53 is emitted from the opposite angle as shown by an incident light beam $T_1$. Accordingly, an incident light beam $T_1'$ having a larger angle than the refractive angle $\theta_1$ is absorbed by the light absorbing layer 2. Thus, in the conventional example shown in FIG. 11, the maximum value of the emission angle from the light control film 51 is controlled by the emission angle β in which the angle inside the light control film 1 corresponds to $\theta_1$.

In such a conventional light control film 51, light having not a larger angle than $\theta_1$, which should be transmitted, may also be absorbed by the light absorbing layer 52 depending on the incident position as shown by the incident light beam $T_2$ of FIG. 11, all of which becomes loss light. Thereby, the light use efficiency drops. Further, the whole light directly made incident from the light source onto the light absorbing layer 52 as shown by the incident light beam $T_1'$ of FIG. 11 becomes loss light, whereby the light use efficiency drops further.

On the other hand, as shown in FIG. 2A, the light control film 1 in the present embodiment is capable of reflecting the incident light beam $T_2$ on the boundary between the high refractive index area 3A and the low refractive index area 3B which is made incident on the high refractive index area 3A spaced apart from the boundary between the light absorbing layer 2 and the transparent layer 3 and has the refractive angle $\theta_1$ inside the film body 1A so as to emit the light beam from the light control film 1. Accordingly, the light control film 1 can suppress loss of light and realize high light use efficiency. Further, since the reflective layer 7 is provided on the light absorbing layer 2 or on the light incident surfaces $H_{IN}$ of the light absorbing layer 2 and the low refractive index area 3B of the transparent layer 3, the light is reflected to the light source side like the incident light beam $T_3$ shown in FIG. 2B, and by reusing the reflected light, higher light use efficiency can be realized.

Next, a lighting device 9 will be described based on FIG. 4.

Figure 4A:
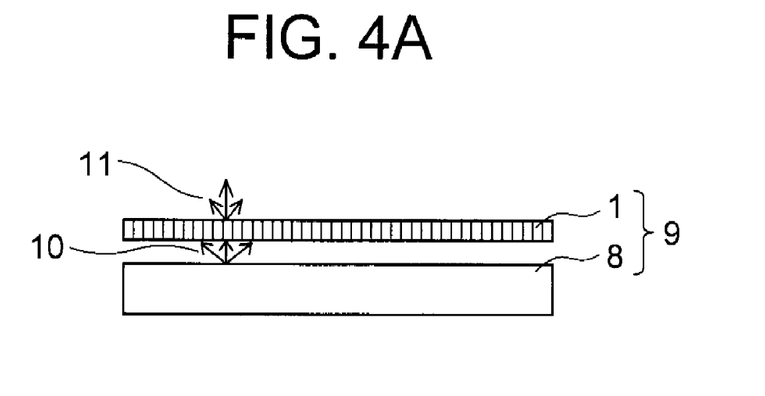
FIG. 4A is a schematic configuration diagram according to a combination of a light control film and a light source.

The lighting device 9 is obtained by combining the light control film 1 and a light source (device) 8, as shown in FIG. 4A.

Figure 4B:
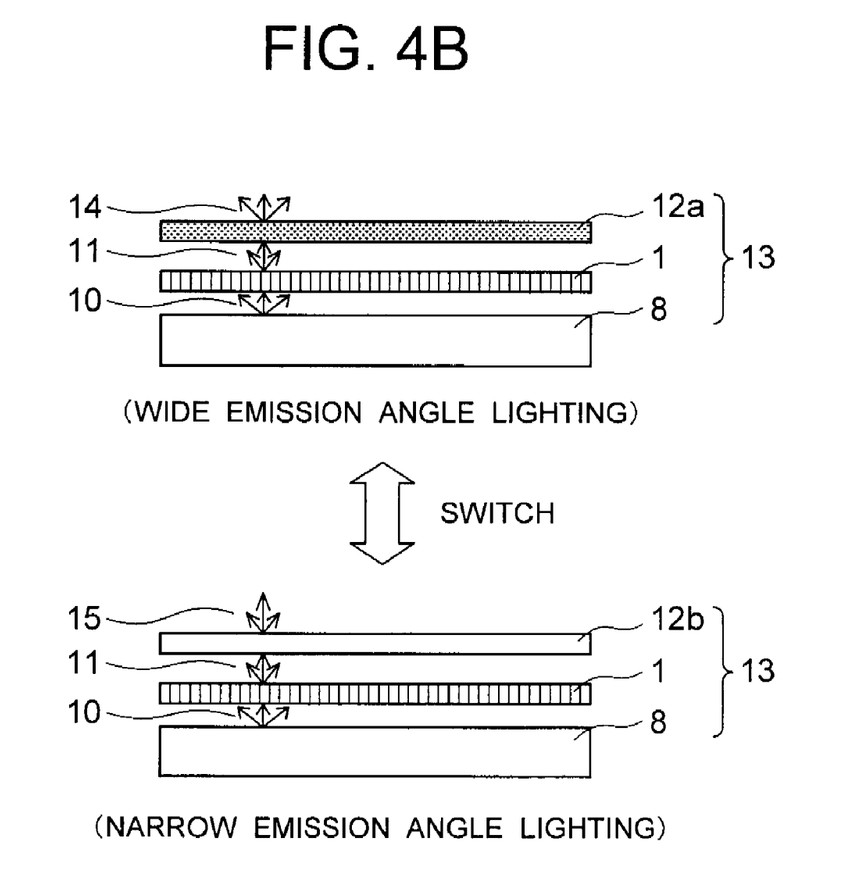
FIG. 4B is an illustration showing an example of a switching use when combining a transparent layer having different refractive index with the one of FIG. 4A.

Further, by arranging an element 12 capable of controlling transmittance and diffusion of incident light in an emitting surface direction of the light control film 1, it is possible to provide a lighting device capable of switching lighting having a wide emission angle (transmission/diffusion controllable element 12 is in a diffusing state: 12a) and lighting having a narrow emission angle (transmission/diffusion controllable element 12 is transparent: 12b) (FIG. 4B).

The transmission/diffusion controllable element 12a in a light diffusing state is in a state where a voltage is not applied between substrates, and the transmission/diffusion controllable element 12b in the light transmitting state is in a state where a voltage is applied between the substrates (the opposite is also possible). Depending on whether a voltage is applied between the substrates, transmitting/diffusing state of the transmission/diffusion controllable element 12 can perform a switch-control.

In the lighting device 13 capable of switching the emission angle, the light use efficiency can be improved by attaching the light control film 1 and the transmission/diffusion controllable element 12 so as to eliminate surface reflection on the transmission/diffusion controllable element 12.

The reference numerals 10, 11, and 14 indicate directions and levels of dispersion of emitted light.

Figure 5A:
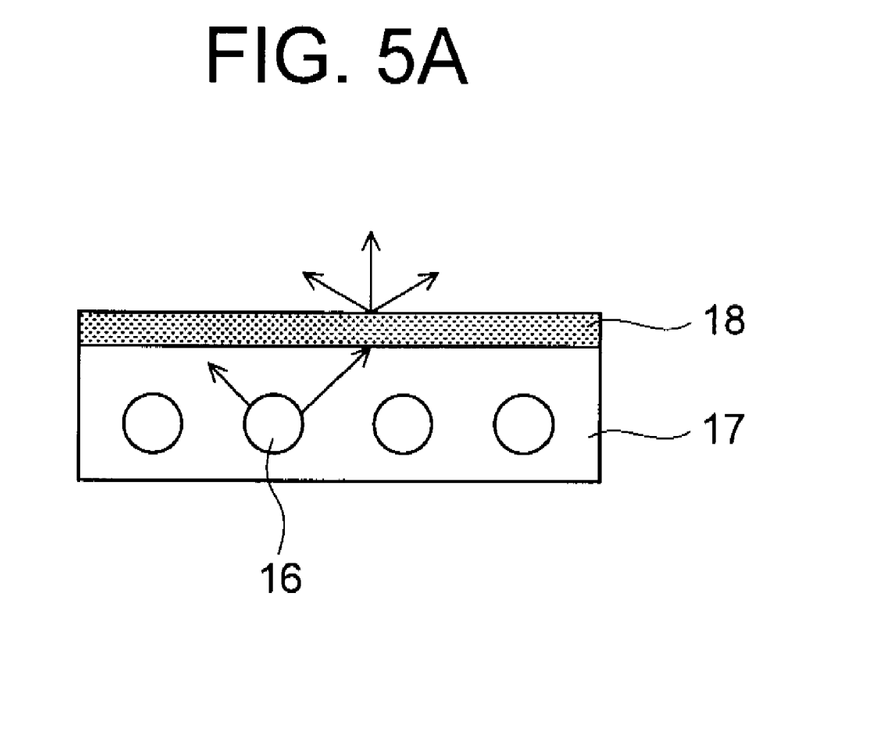
FIG. 5A is a schematic diagram showing a light source in which a reflecting sheet and a diffusion plate are combined with a cold cathode tube.
Figure 5B:
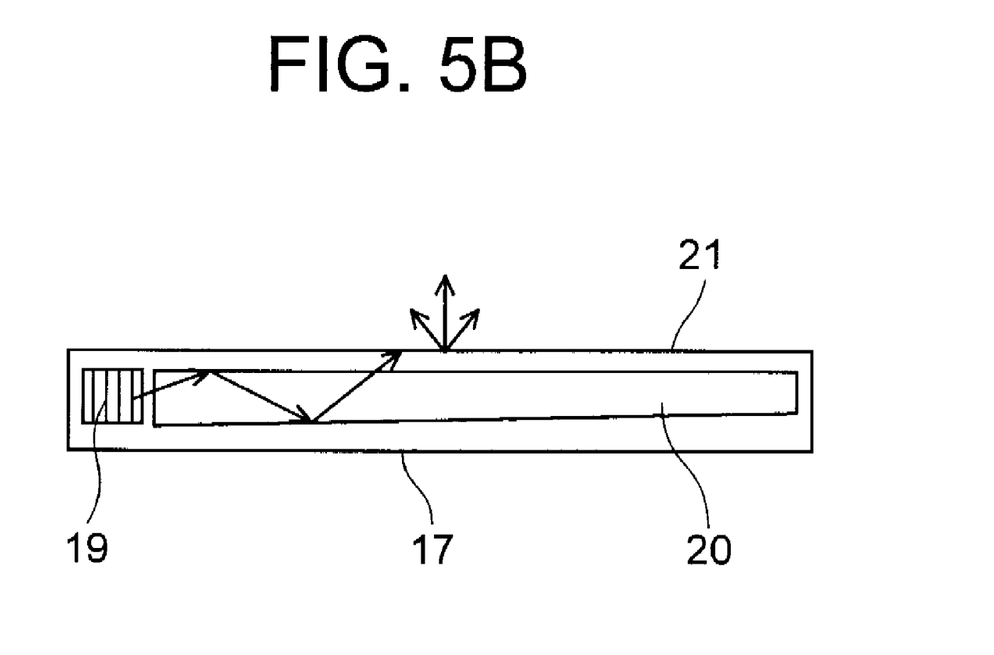
FIG. 5B is a configuration diagram showing a light source in which an LED is combined with a light guide plate and an optical film.

As the light source (device) 8, a light source (device) formed by combining a cold cathode tube 16 with a reflecting sheet 17 and a diffusion plate 18 shown in FIG. 5A, or a light source (device) formed by combining an LED 19 with a light guide plate 20 and an optical film 21 shown in FIG. 5B can be used. In such a case, various optical films can be arranged on the emitting side of the light control film 1.

As the element 12 capable of controlling transmission/dispersion of light, a well-known liquid crystal element capable of controlling transmission and diffusion such as polymer-dispersed liquid crystal element can be used. In such a case, the light use efficiency can also be improved at the same time by bonding or closely attaching the light control film and the transmission/diffusion controllable element 12.

Figure 6:
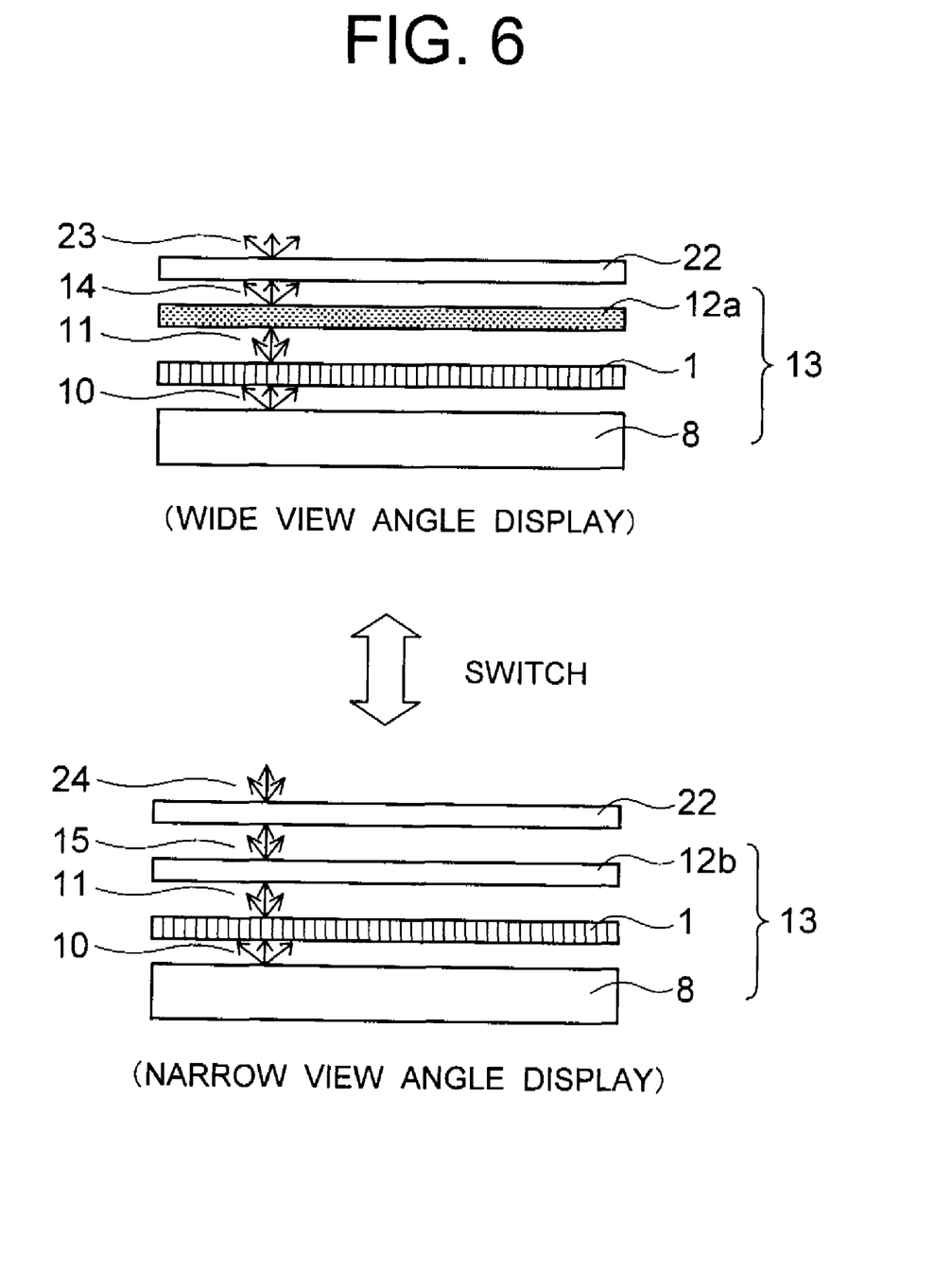
FIG. 6 is an illustration showing a configuration example of a display device according to the present invention.

Further, by providing the display panel 22 to the lighting device 9 of the present invention, a display device capable of controlling the view angle or a display device capable of switching a wide view angel and a narrow view angle can be provided (FIG. 6). The display panel 22 may be a transparent liquid crystal display panel or a translucent liquid crystal display panel. Further, by providing the light control film 1 according to the present embodiment on the viewer side of the display device, it is possible to realize a display device having high light use efficiency by preventing limitation in the view angle and reflection. Such display devices include CRT, plasma display, and an organic electroluminescence display, besides a liquid crystal display device.

Note that the reference numerals 23 and 24 show directions and the levels of dispersion of emitted light.

EXAMPLES

Next, In order to confirm the effectiveness of the light control film 1 according to the present invention, experiments were performed to compare with conventional examples.

Comparative Example 1

Conventional Example

Figure 7A:
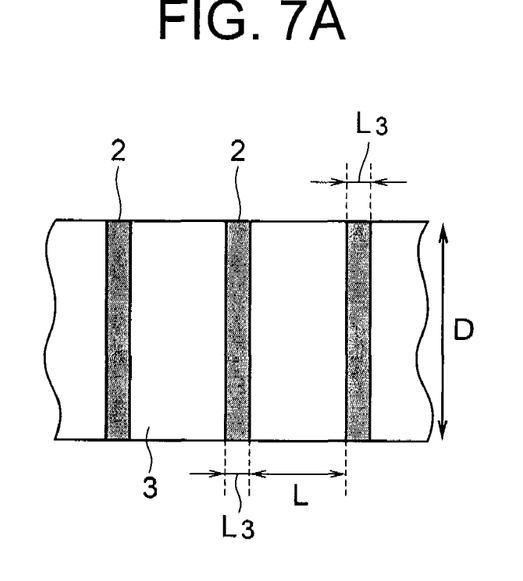
FIG. 7A is an illustration showing a light control film of a conventional example which is an experiment subject.

As a conventional light control film, a light control film (FIG. 7A) was formed in which the width L of the transparent layer was 0.085 mm, the refractive index n of the transparent layer was 1.60, the width $L_3$ of the light absorbing layer was 0.015 mm, and the thickness D was 0.304 mm. By combining it with the light source, emission angle distribution and light use efficiency (emitted light amount from light control film emitted light amount from Tight source) were measured.

Figure 7B:
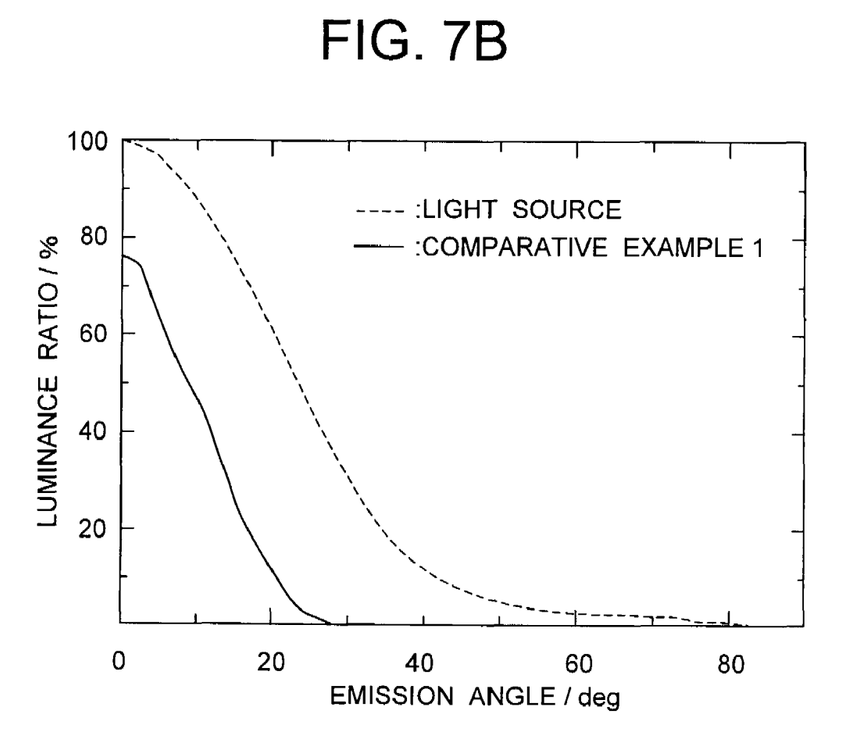
FIG. 7B is a characteristic curve (emission angle distribution) diagram of the light control film of FIG. 7A.

As a result, distribution including the maximum emission angle of 29° was obtained, and the light use efficiency was 32%, as shown in FIG. 7B.

Comparative Example 2

Specific Example of the Above Embodiment

Figure 8:
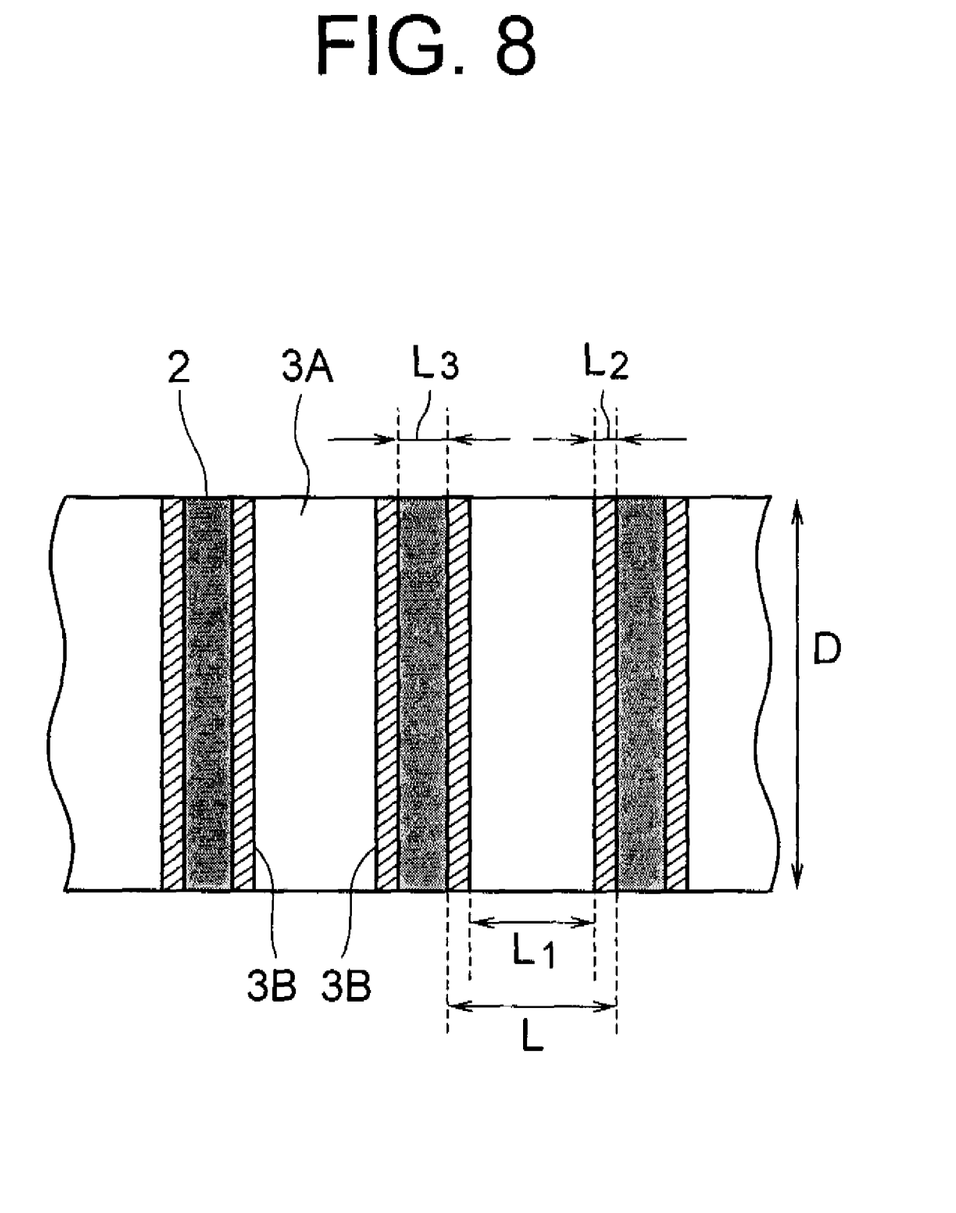
FIG. 8 is an illustration showing the film body part of the light control film according to the present invention which is set to perform measurement under the same conditions as those of the conventional example of FIG. 7A.

A light control film (FIG. 8) was formed in which the width $L_1$ of the high refractive index area was 0.055 mm, the refractive index $n_1$ of the high refractive index area was 1.60, the width $L_2$ of the low refractive index area was 0.015 mm, the refractive index $n_1$ of the low refractive index area was 1.53, the width $L_3$ of the light absorbing layer was 0.015 mm, and the thickness D is 0.304 mm. By combining it with the light source, emission angle distribution and light use efficiency (emitted light amount from light control film/emitted light amount from light source) were measured.

Figure 9A:
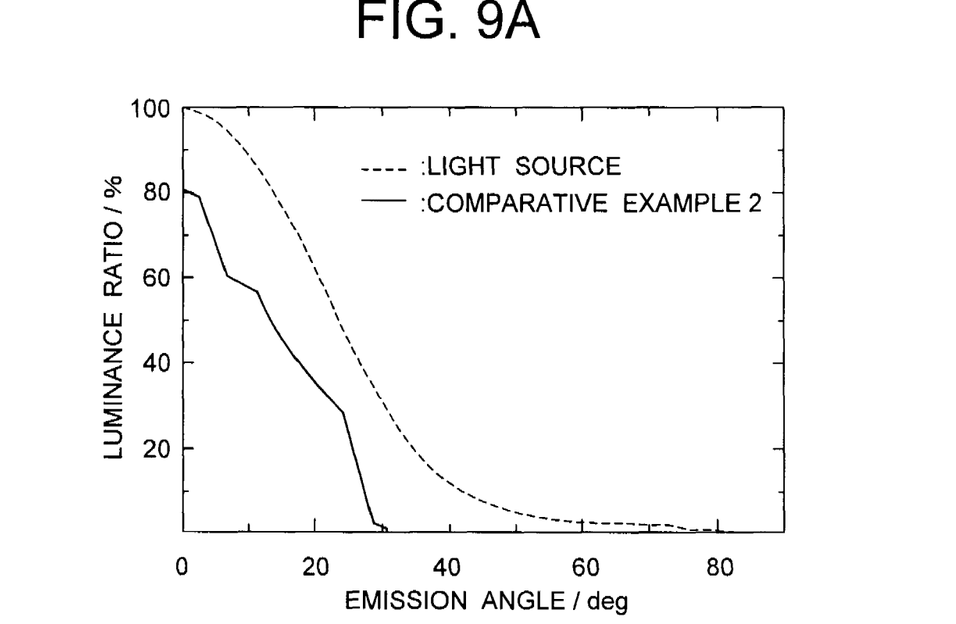
FIG. 9A is a diagram showing the emission angle distribution according to the comparative example 1.

As a result, distribution including the maximum emission angle of 31° was obtained, and the light use efficiency was 51%, as shown in FIG. 9A.

Example 1

Example of a Case where Al Reflective Film was Provided in Comparative Example 2

A light control film 1 was formed in which an Al reflective film was provided on the light incident surface of the light absorbing layer 2 and on the light incident surface of the low refractive index area 3B of the transparent layer 3 of the light control film 1 of the comparative example 2. By combining it with the light source, emission angle distribution and light use efficiency (emitted light amount from light control film/emitted light amount from light source) were measured.

Figure 9B:
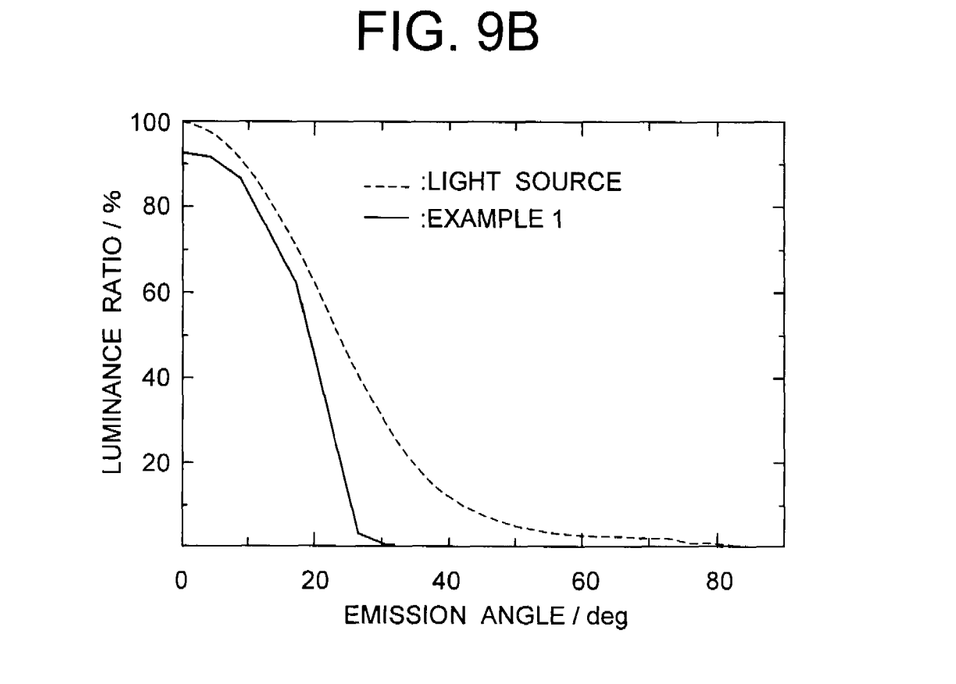
FIG. 9B is a diagram showing the emission angle distribution according to the example 1.

As a result, distribution including the maximum emission angle of 32° was obtained, and the light use efficiency was 67%, as shown in FIG. 9B.

Comparative Example 3

Conventional Example

A liquid crystal display device capable of switching view angles were formed in which a polymer-dispersed liquid crystal display element and a transmissive liquid crystal display element were arranged in a light emitting direction of the light source and the light control film of the comparative example 1.

As a result, the light use efficiency was 1.3%.

Embodiment 2

Figure 10:
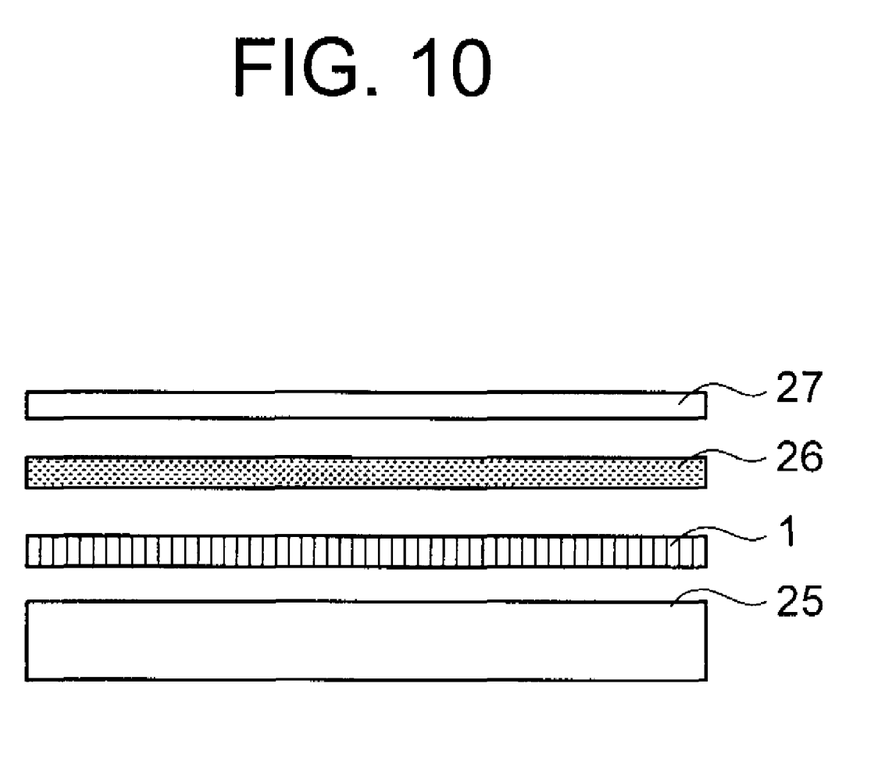
FIG. 10 is a configuration diagram showing a liquid crystal display element capable of switching view angle according to the example 2.

In order to compare with the conventional example of the comparative example 3, a liquid crystal display device capable of switching view angles was formed (FIG. 10) in which a polymer-dispersed liquid crystal display element 26 and a transmissive liquid crystal display element 27 were arranged in a light emitting direction of the light source 25 and the light control film of the example 1. As a result, the light use efficiency was 2.5%.

As described above, in the embodiments described above, it is possible to obtain high light use efficiency as obvious from the comparative examples, and also to provide a light control film capable of controlling emission angle easily. At the same time, by using the light control film, it is possible to provide a lighting device in which the emission angle is controlled, and further, a liquid crystal display device in which the emission angle is controlled. This is an excellent effect which has not been achieved conventionally.

INDUSTRIAL APPLICABILITY

Examples of use of the present invention include lighting (backlight) of a liquid crystal display device and indoor lighting.

What is claimed is:

1. A light control film, comprising a film body having a transparent layer sandwiched between light absorbing layers, wherein:
    the transparent layer includes a high refractive index area and low refractive index areas,
    the low refractive index areas sandwich the high refractive index area,
    the low refractive index areas contact the light absorbing layers,
    the light absorbing layers and the transparent layer are laminated alternately, and
    the following items are provided in the following order in a laminating direction which is perpendicular to a direction of a thickness of the light control film: a first light absorbing layer, a first low refractive index area, a first high refractive index area, a second low refractive index area, and a second light absorbing layer.

2. The light control film, according to claim 1, wherein a reflective layer is provided on a light incident surface of the light absorbing layer.

3. The light control film, according to claim 1, wherein
    a light reflective layer is provided on a light incident surface of the low refractive index area of the transparent layer.

4. The light control film, according to claim 1, wherein a protective layer is provided on at least one of a light incident surface and a light emitting surface of the film body.

5. The light control film, according to claim 4, wherein a reflective layer is provided on an outer face of the protective layer.

6. The light control film, according to claim 1, wherein at least one of a light incident surface and a light emitting surface of the film body is diffusion-processed.

7. A lighting device comprising: a light source which is so formed as to enable surface emission; and the light control film according to claim 1, wherein the light control film is arranged from the light source in a direction in which light is enabled to emit from the light source.

8. The lighting device, according to claim 7, wherein a light diffusion control element capable of controlling transmission and diffusion of light is arranged from the light control film in a direction in which the light is enabled to emit from the light control film.

9. The lighting device, according to claim 7, wherein the light diffusion control element is attached to the light control film so as to be integrated.

10. A display device in which the lighting device according to claim 7 is provided on a light display panel.

11. A display device in which the light control film according to claim 1 is provided on an outside display surface side of a display panel,
    wherein the light control film has a back side which is provided on the outside display surface side of the display panel, wherein the light control film has a front side which faces in an opposite direction than a direction that the back side faces, and wherein the direction of the thickness of the light control film traverses from the back side to the front side of the light control film.

12. The light control film, according to claim 2, wherein the film body has a light incident surface, and wherein the light incident surface of the light absorbing layer comprises part of the light incident surface of the film body.

13. The light control film, according to claim 5, wherein the protective layer has an inner face and the outer face, and wherein the inner face is located closer to the film body than the outer face.

14. The lighting device, according to claim 8, wherein the light diffusion control element is capable of switching between a light diffusing state and a light transmitting state.

15. A display device wherein the display device is arranged from the lighting device according to claim 7 in a direction in which light is enabled to emit from the lighting device.

16. The display device wherein the light control film according to claim 1 is arranged from the display panel in a direction in which light is enabled to emit from the display panel.

17. The light control film, according to claim 1, wherein a low refractive index area is provided on a light absorbing layer, wherein the low refractive index area is provided on the high refractive index area, wherein the high refractive index area is provided on another low refractive index area, and wherein the another low refractive index area is provided on another light absorbing layer.

18. The display device of claim 11, wherein the light absorbing layers are provided in a normal direction relative to a display direction of the display panel from the transparent layer.

19. The light control film, according to claim 1, wherein the following items are provided in the following order in the laminating direction: a second high refractive index area, a third low refractive index area, the first light absorbing layer, the first low refractive index area, the first high refractive index area, the second low refractive index area, the second light absorbing layer, a fourth low refractive index area, a third high refractive index area, a fifth low refractive index area, a third light absorbing layer, a sixth low refractive index area, and a fourth high refractive index area.

20. The light control film according to claim 1, wherein the light control film has a front surface and a back surface which are connected by a side surface, wherein the front surface and the back surface both have a surface area which is greater than a surface area of the side surface, and wherein the direction of thickness of the light control film is a direction which connects the front surface and the back surface by the shortest distance.

\* \* \* \* \*